US005430838A

United States Patent [19]

Kuno et al.

[11] Patent Number: 5,430,838

[45] Date of Patent: Jul. 4, 1995

[54] METHOD AND APPARATUS FOR MULTI-WINDOW DISPLAY WITH ENHANCED WINDOW MANIPULATION FACILITIES

[75] Inventors: Yoshinori Kuno, Kanagawa; Hiroshi Mizoguchi, Tokyo; Minoru Ishikawa; Hiroaki Kubota, both of Kanagawa, all of Japan

[73] Assignee: Kabushiki Kaisha Toshiba, Kawasaki, Japan

[21] Appl. No.: 118,359

[22] Filed: Sep. 9, 1993

Related U.S. Application Data

[63] Continuation of Ser. No. 622,524, Dec. 5, 1990, abandoned.

[30] Foreign Application Priority Data

Dec. 6, 1989 [JP] Japan ................................ 1-315433

[51] Int. Cl.[6] ................................ G06F 13/10

[52] U.S. Cl. ................................ 395/157; 395/133; 345/119; 345/189

[58] Field of Search ............... 395/133, 157, 137, 138, 395/139; 345/119, 120, 115, 116, 121, 122, 125, 126, 127, 131, 189

[56] References Cited

U.S. PATENT DOCUMENTS

| | | | |
|---|---|---|---|
| 4,689,616 | 8/1987 | Goude et al. | 345/121 |
| 4,698,778 | 10/1987 | Ito et al. | 395/139 |
| 4,700,320 | 10/1987 | Kapur | 345/120 |
| 4,714,918 | 12/1987 | Barker et al. | 340/724 |
| 4,779,081 | 10/1988 | Nakayama et al. | 345/120 |
| 4,860,218 | 8/1989 | Sleator | 395/157 |
| 4,875,034 | 10/1989 | Brokenshire | 345/120 |
| 4,947,257 | 8/1990 | Fernandez et al. | 345/120 |
| 4,954,819 | 9/1990 | Watkins | 395/157 |
| 4,992,781 | 2/1991 | Iwasaki et al. | 340/747 |
| 5,043,923 | 8/1991 | Joy et al. | 395/157 |
| 5,057,825 | 10/1991 | Fujii | 395/157 |
| 5,091,720 | 2/1992 | Wood | 345/120 |
| 5,146,592 | 9/1992 | Pfeiffer et al. | 395/157 |
| 5,347,624 | 9/1994 | Takahashi et al. | 395/157 |

FOREIGN PATENT DOCUMENTS

| | | |
|---|---|---|
| 240989 | 4/1987 | European Pat. Off. . |
| 265643 | 9/1987 | European Pat. Off. . |
| 2180729 | 5/1986 | United Kingdom . |
| 2186470 | 8/1987 | United Kingdom . |

OTHER PUBLICATIONS

N. Mockhoff, *Electronic Design International*, "Electronic Design Report: Graphics Chips Forge High-Res Boards for PCs, Workstations", vol. 36, No. 6, Mar. 17, 1988, pp. 62–72.

Andrews, "Windows: The Official Guide to Microsoft's Operating Environment", Microsoft Press (1986), pp. 1–12 and 127–145.

*Primary Examiner*—Heather R. Herndon
*Assistant Examiner*—N. Kenneth Burraston
*Attorney, Agent, or Firm*—Foley & Lardner

[57] ABSTRACT

A method and an apparatus for multi-window display with enhanced window manipulation facilities. In the apparatus, window images to be displayed in multi-window display are stored in a bit map memory. Various image processing operations are performed on the window images stored in the bit map memory, by regarding the window images as graphic images. Appropriate sections of processed window images are transferred to a frame buffer by using a bit block transfer device, and the image in the frame buffer is displayed on a display device.

8 Claims, 6 Drawing Sheets

PRIOR AET

FIG.10

| LABEL NO. | OPERATION LEVEL 1 | OPERATION LEVEL 2 | OPERATION LEVEL 3 |
|---|---|---|---|
| 1 | CLOUD | CLOUD | CLOUD |
| 2 | HEAD | UPPER BODY | PERSON |
| 4 | RIGHT ARM | | |
| 5 | UPPER TORSO | | |
| 6 | LEFT ARM | | |
| 8 | LOWER TORSO | LOWER BODY | |
| 9 | RIGHT LEG | | |
| 10 | LEFT LEG | | |
| 3 | LEAVES | TREE | TREE |
| 7 | TRUNK | | |

METHOD AND APPARATUS FOR MULTI-WINDOW DISPLAY WITH ENHANCED WINDOW MANIPULATION FACILITIES

This application is a continuation of application Ser. No. 07/622,524, filed Dec. 5, 1990 now abandoned.

BACKGROUND OF THE INVENTION

1. Field of the Invention

The present invention relates to a multi-window display apparatus for displaying a plurality of image information on a display device of a work station by using windows.

2. Description of the Background Art

One of the important features of a work station is a multi-window display function in which a plurality of windows are manipulated on a display screen in various modes such as moving, enlarging, contracting, and superposing.

An example of a conventional multi-window display apparatus is shown in FIG. 1.

In this apparatus, a graphics controller 101 of the bit block transfer type reads out a bit map from a bit map memory 102, which is a memory for the display which stores bit values of picture elements in one or more bits. The graphics controller 101 then sends the bit map to a frame buffer 103, through which an image given by the values of the picture elements stored in the bit map memory 102 is displayed on a CRT 104. The graphics controller 101 is also connected with a host CPU 106, a main memory device 107, an external memory device 108, a mouse 109, and a keyboard 110 of a work station, through a host bus 105, from which various commands related to the display can be given.

In such a conventional multi-window display apparatus, only rectangular windows are used exclusively, and a user is not provided with choices for the form of the windows, although the size of the windows and the size of letters in the windows can be changed freely. The rectangular windows are also used exclusively in displaying graphic images, regardless of the content of the graphic images to be displayed.

Thus, the conventional multi-window display apparatus has been rather limited in terms of manipulations of windows. For example, it has been impossible to construct a window in such a form from which a content displayed in the window can be easily recognized, or to selectively deal with a part of the window display such as a head portion of a display in a shape of a human body.

SUMMARY OF THE INVENTION

It is, therefore, an object of the present invention to provide a method and an apparatus for multi-window display with enhanced window manipulation facilities, which treats all types of the contents of the windows as graphic images.

According to one aspect of the present invention there is provided a multi-window display apparatus, comprising: display means having a display screen; frame buffer means for storing images to be displayed on the display screen of the display means; bit map memory means for storing window images to be displayed in a multi-window display; image processing means for performing various image processing operations on the window images stored in the bit map memory means, by regarding the window images as graphic images; and a graphics controller including bit block transfer means for transferring appropriate sections of window images processed by the image processing means to the frame buffer means.

According to another aspect of the present invention there is provided a method of multi-window display, comprising the steps of: storing window images to be displayed in multi-window display in bit map memory means; performing various image processing operations on the window images stored in the bit map memory means, by regarding the window images as graphic images; transferring appropriate sections of window images processed at the performing step to frame buffer means by using bit block transfer means; and displaying the image in the frame buffer means on display means.

Other features and advantages of the present invention will become apparent from the following description taken in conjunction with the accompanying drawings.

BRIEF DESCRIPTION OF THE DRAWINGS

FIG. 10 is a table of subdivided elements for the labelled image of FIG. 9.

DETAILED DESCRIPTION OF THE PREFERRED EMBODIMENTS

Figure 1:
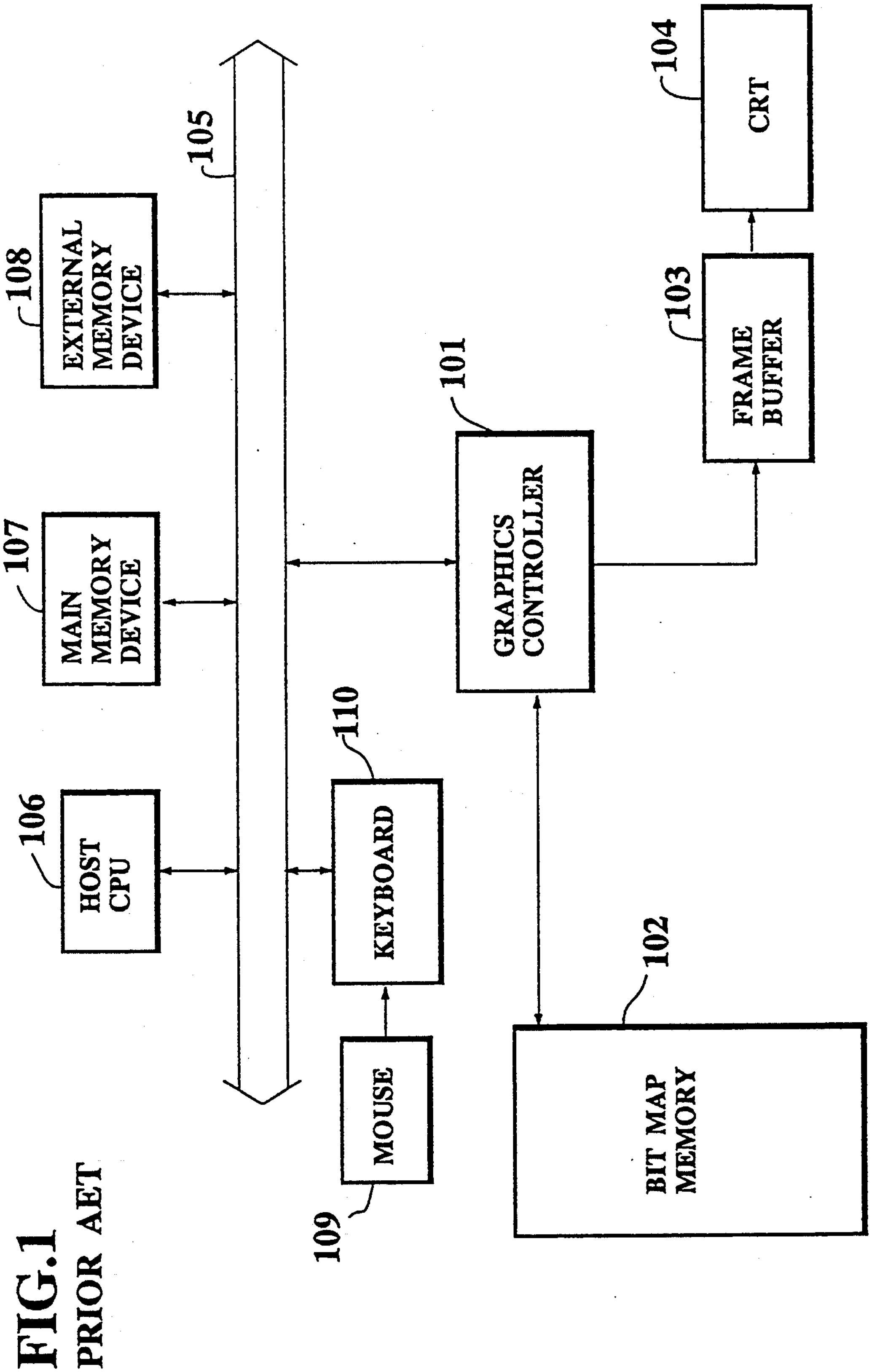
FIG. 1 is a schematic block diagram of a conventional multi-window display apparatus.
Figure 2:
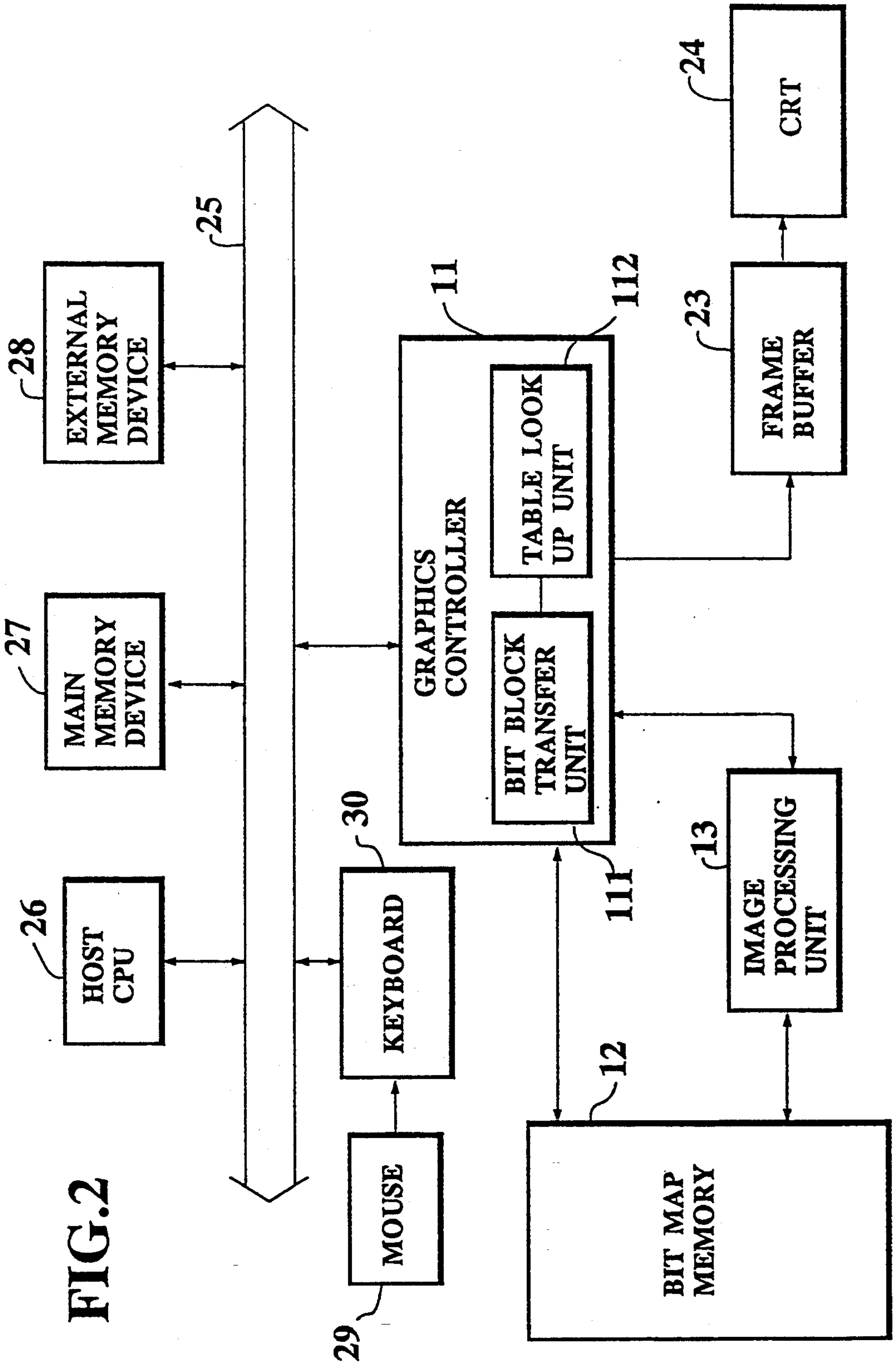
FIG. 2 is a schematic block diagram of one embodiment of a multi-window display apparatus according to the present invention.

Referring now to FIG. 2, one embodiment of a multi-window display apparatus according to the present invention will be described.

This apparatus comprises a graphics controller 11 for controlling a multi-window display, which includes a bit block transfer unit 111 and a table look up unit 112, a bit map memory 12 for storing images to be displayed in the multi-window display in terms of values of picture elements, an image processing unit 13 for processing the images stored in the bit map memory 12 as graphic images, a CRT 24 for displaying images, and a frame buffer 23 for temporarily storing images to be displayed on the CRT 24. The graphics controller 11 is also connected with a host CPU 26, a main memory device 27, an external memory device 28, a mouse 29, and a keyboard 30 of a work station, through a host bus 25, from which various commands related to the display can be given.

The bit block transfer unit 111 transfers sections to be displayed in the multi-window display selected by the graphics controller 11 from the images stored in the bit map memory 12 processed by the image processing unit 13.

The table look up unit 112 controls the transfer by the bit block transfer unit 111, to be described in detail.

The image processing unit 13 performs various image processing operations on the images stored in the bit map memory 12, by regarding these images as if they are graphic images, regardless of whether they indeed are graphic images or not. Here, all the image processing operations to be performed by the image processing unit 13 are well known operations conventionally performed by a graphic image processing device.

Figure 3:
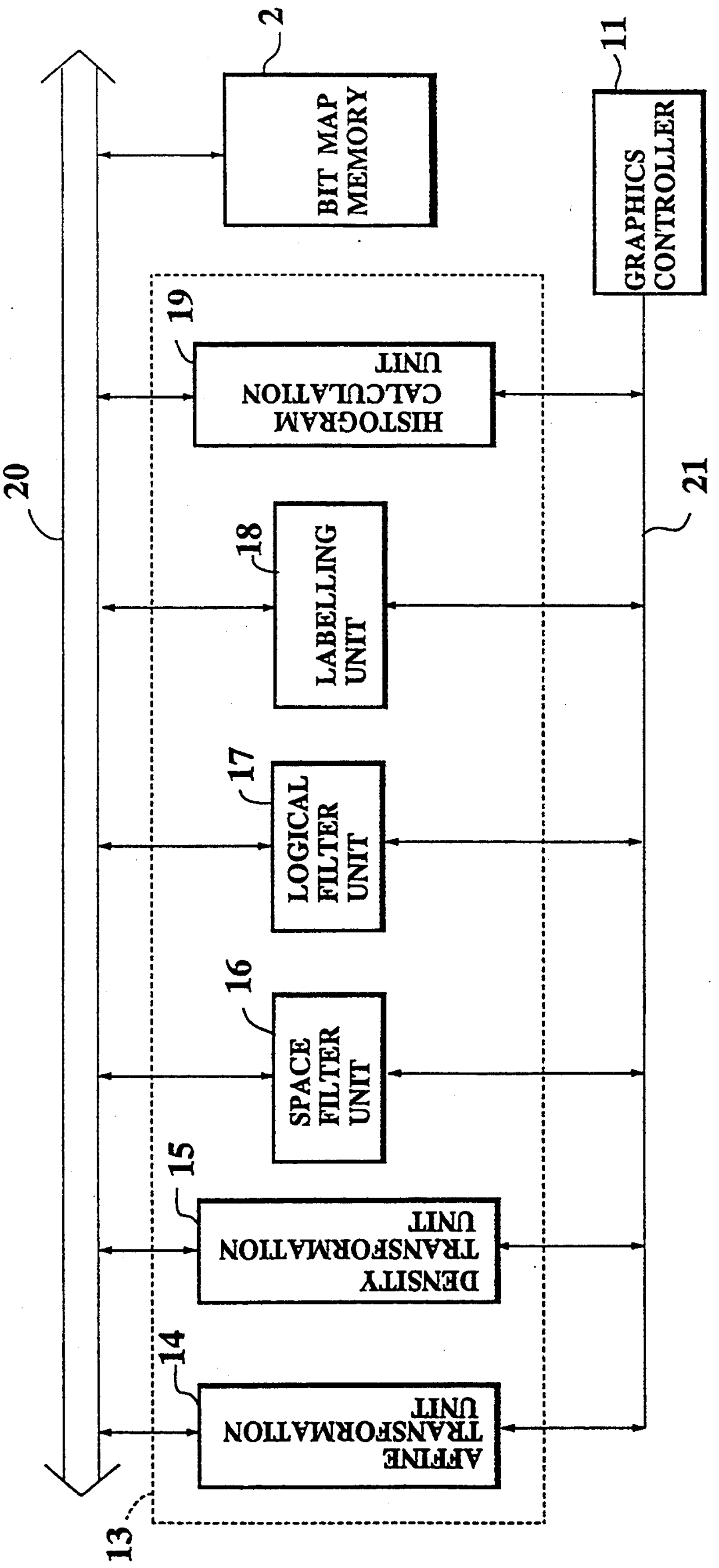
FIG. 3 is a detailed block diagram of an image processing unit of the multi-window display apparatus of FIG. 2.

More specifically, as shown in FIG. 3, the image processing unit 13 further comprises an affine transformation unit 14, density transformation unit 15, space filter unit 16, logical filter unit 17, labelling unit 18 and a histogram calculation unit 19, all of which are connected with the bit map memory 12 through a bus 20, and with the graphics controller 11 through control signal line 21.

Briefly, this apparatus operates as follows: first, the image processing unit 13 processes the images stored in the bit map memory 12; then, the graphics controller selects the sections to be displayed in the multi-window display from the processed images; then, the selected sections are transferred to the frame buffer 23 by the bit block transfer unit 111, under the control of the table look up unit 112; and then, the content of the frame buffer 3 is displayed on the CRT 24.

Now, the operation of this apparatus in its various modes of a multi-window display will be described in detail.

MODE 1: Contracted Display Mode.

A so called overlap style multi-window display, in which one window is to be superposed on another, is convenient as a number of windows can be opened, but when the number of windows becomes numerous, it is often difficult to remember the contents of the windows which are overlapped by many other windows.

To cope with this situation, less frequently used windows are contracted and placed around edges of a display screen in this apparatus.

Namely, the less frequently used windows formed in the bit map memory 12 are contracted into a suitable size by the affine transformation unit 14 of the image processing unit 13, and these contracted windows are displayed on the CRT 24 through the graphics controller 11 and the frame buffer 23.

In this contracted display mode, even when the letters of the displayed images becomes too small to read, a pattern of letters arrangement can provide a key for a user to recall the content of the displayed images quickly. In addition, a part of the displayed images may be retained in a readable size, so as to provide an easier clue for the user.

It is noted that in a simple operation, such as this contracted display mode, the processed images obtained by the image processing unit 13 need not be stored in the bit map memory 12, and can be written into the frame buffer 23 directly, without storing.

It is also pointed out that although the simple change of the sizes of the windows and letters can be realized in a conventional work station, the conventional method is inapplicable to a case in which the displayed images include graphic images or tables in addition to the letters. On the contrary, this apparatus can deal with any displayed images including a case involving the graphic images or tables, because the image processing unit 13 treats the entire displayed images as graphic images.

Figure 4:
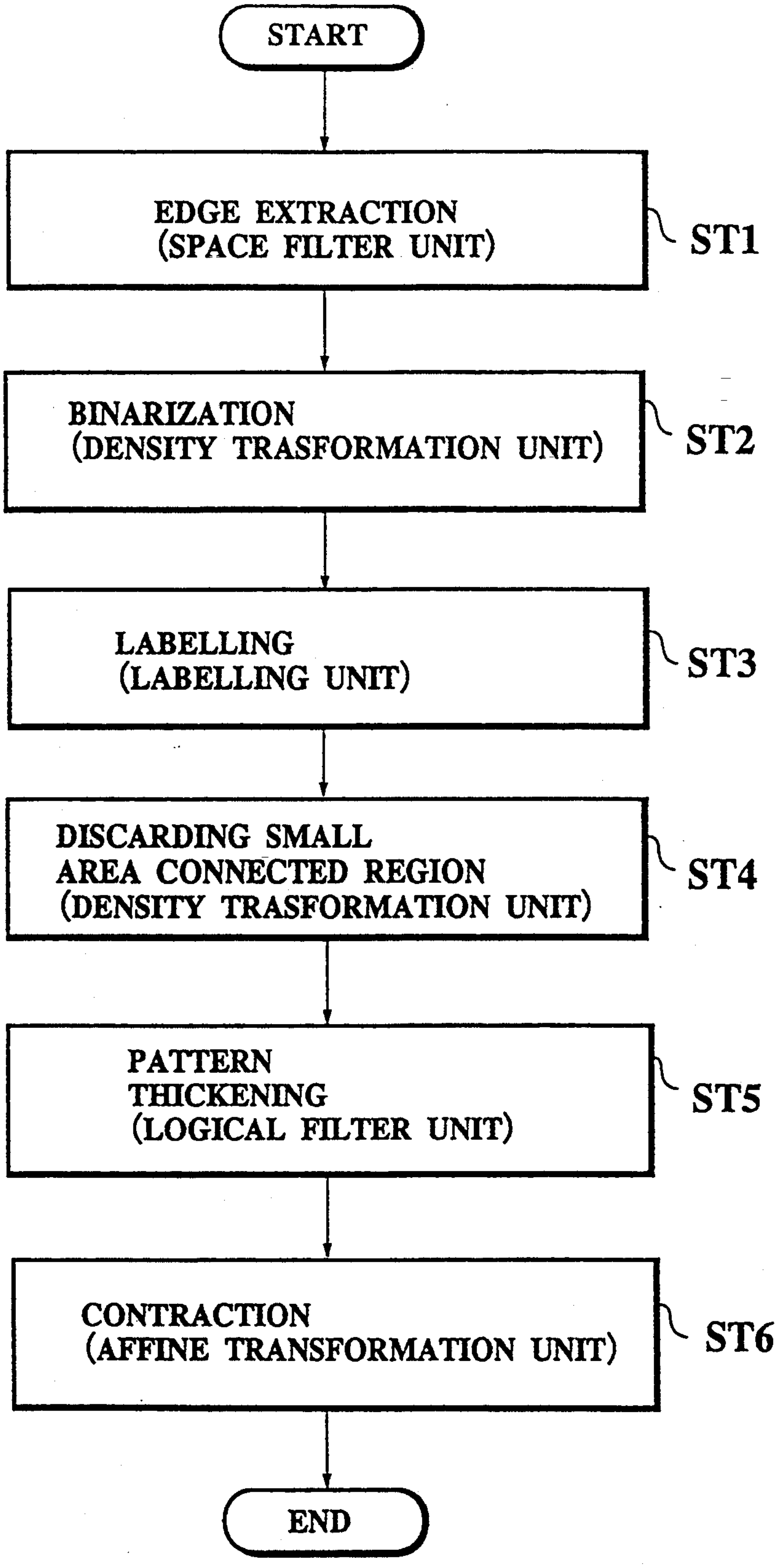
FIG. 4 is a flow chart for the operation of the image processing unit of FIG. 3 in a contracted display mode.

In more sophisticated circumstances, such as those involving graphic images or tables whose contents are difficult to recognize in the contracted display mode, the following operation is carried out according to the flow chart of FIG. 4.

Namely, at the step ST1, a space filter, such as a Sobel operator, is applied to the images by the space filter unit 16, in order to extract edges of the figures in the images. Then, at the step ST2, a binarization is performed on the extracted edges by the density transformation unit 15. Next, at the step ST3, a connected region labelling is performed on the binarized edges by the labelling unit 18. Then, at the step ST4, an area of each connected region is calculated by the histogram calculation unit 19, and the connected regions of small area are discarded by changing their binary values to "0" using the density transformation unit 15, in order to simplify the images. Next, at the step ST5, a logical filter is applied to the simplified images by the logical filter unit 17, in order to thicken the images. For example, the binary values of four nearest neighbor picture elements of a picture element having a binary value of "1" are changed into "1" at this step. Alternatively, the binary value of a picture element having a binary value "0" is changed into "1" when one of its four nearest neighbor picture elements has a binary value of "1" at this step. Finally, at the step ST6, the affine transformation is applied to the thickened images by the affine transformation unit 14, so as to obtain the contracted images. The resulting contracted images are then displayed on the CRT 24 as the images in the contracted display mode. By this process, the characteristic features of the original images are emphasized, so that recognition of the images in the contracted display mode becomes easier.

MODE 2: Figure Manipulation Mode.

In this mode, figure manipulation bits are allocated to each image in the bit map memory 12, in addition to the values of picture elements for the image.

Figure 5:
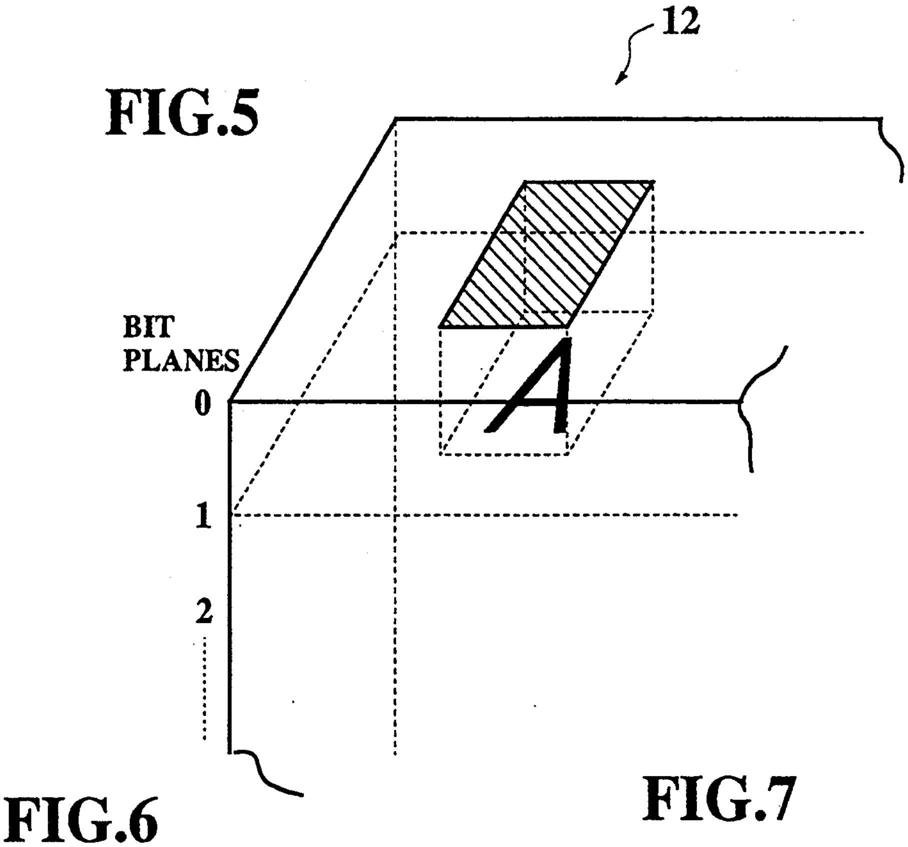
FIG. 5 is a conceptual diagram of a bit map memory of the multi-window display apparatus of FIG. 2, showing its bit plane structure.

Namely, as shown in FIG. 5, for the image comprising a letter "A", values of picture elements for the letter "A" are stored at a "level 1" bit plane, while a region corresponding to this letter "A" (shaded region) is recorded by the figure manipulation bits at a "level 0" bit plane.

The figure manipulation bits are utilized by the table look up unit 112 of the graphics controller 11 in controlling the transfer by the bit block transfer unit 111. For example, the table look up unit 112 controls the bit block transfer unit 111 such that only those regions which have a binary value "1" for its figure manipulation bit are transferred to the frame buffer 28, while the other regions having the figure manipulation value "0" are ignored, so that the original content of the frame buffer 23 remains unchanged in those region. This enables the bit block transfer unit 111 actually to deal with a rectangular region, while, in effect, dealing with non-rectangular region, i.e., the region of the figure manipulation bit value "1" can be distributed arbitrarily.

Furthermore, the figure manipulation bits can also be utilized in the following ways.

(1) Displaying a Window of an Irregular Form.

The window of an irregular form can be displayed by arranging the region of the figure manipulation bit value "1" in a desired form, on a rectangular (regular) window region formed in the bit map memory 12. The form of the window in this case may be that which is obtained by the image processing unit 13 as a result of a cutting out operation. In a case of writing letters in the window of irregular form, the line should be changed whenever the letter line reaches to the region of the figure manipulation value "0".

(2) Omitting Regions Containing No Information.

For the images of letters in the bit map memory 12, only those regions corresponding to the letters are given the figure manipulation bit value "1", as shown in FIG. 5. Also, a region corresponding to one letter may be allocated for each carriage return code.

In this manner, the remaining regions are ignored in the transfer to the frame buffer 23, so that the content of the previous window which is overlapped by the present window remains visible in those remaining regions. Similarly, in a case of graphic images, only those regions corresponding to the figure elements are given the figure manipulation bit value "1". In such a case of the graphic images, if the regions of the figure manipulation bit value "1" are limited to the immediate vicinity of line elements appearing in the graphic images, it is often difficult to distinguish the content of the present window from the content of the previous window. To cope with this, the connected region labelling is performed for the graphic images, and rectangles enclosing the connected regions are designated for the regions of the figure manipulation bit value "1". Alternatively, the thickening of the graphic images used in the contracted display mode described above can be applied to the graphic images.

(3) Partial Display of a Window.

As with case (1) above, only a part of the window can be displayed by arranging the region of the figure manipulation bit value "1" in a desired form, on a rectangular (regular) window region formed in the bit map memory 12. For example, only a rectangular sub region of the original rectangular window region which frames around the significant information can be displayed by using the appropriate figure manipulation bit values. Alternatively, only a non-rectangular sub region of the original rectangular window region which is shaped in a form of the significant information itself can be displayed by using the appropriate figure manipulation bit values.

MODE 3: Graphical Processing Mode.

Because the entire images in the bit map memory 12 are treated as graphic images by the image processing unit 13 in this apparatus, various processing operations which are conventionally limited to the purely graphic images can be applied to any image to be displayed in the multi-window display.

Figure 6:
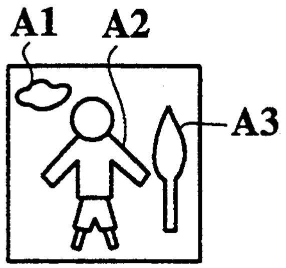
FIG. 6 is an illustration of an example of graphic image to be processed in the multi-window display apparatus of FIG. 2, in a graphical processing mode.

As an example, a case of processing a graded density level graphic image shown in FIG. 6, which includes three figures A1(cloud), A2(person), and A3(tree) will be described. In this case, the bit map memory 12 stored the figure manipulation bits at the "level 0" bit plane, and an n-th grade density picture element value at an "n-th level" bit plane.

Now, in order to be able to perform operations such as moving, enlarging, contracting, or coloring with respect to each figure independently, the figures A1, A2, and A3 have to be separated out from the background first.

Figure 7:
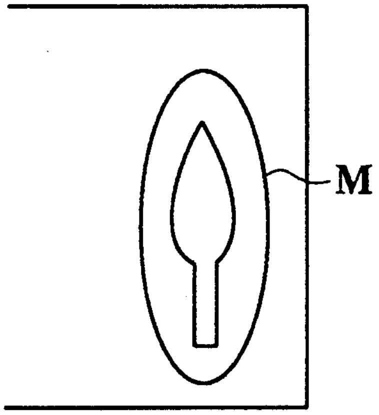
FIG. 7 is an enlarged illustration of a part of the example of FIG. 6 for explaining one method of separating the figure from the background.

This can be achieved in various different manners. For instance, one method, effective in a case having a sufficient contrast between the figures and the background, comprises the steps of obtaining the histogram for the density levels by using the histogram calculation unit 19, determining an appropriate separation threshold density level, separating out by using the binarization by the density transformation unit 15, and labelling the binarized image by the labelling unit 18. Alternatively, the separation can be achieved by tracing the outlines of the figures A1, A2, and A3 using a pointing device such as the mouse 9, painting the interior regions of the traced outlines, and labelling. The separation may also be achieved by the painting of the figures from which the binary image with figures painted is obtained, and the labelling of the painted out binary image. Another method for achieving the separation is first encircling each figure with an enclosing line M as shown in FIG. 7 specified by using the mouse 9, obtaining the histogram within the enclosing line M, determining a separation threshold, binarizing, and labelling. The mouse 9 may be used for the purpose of correcting in these methods.

Figure 8:
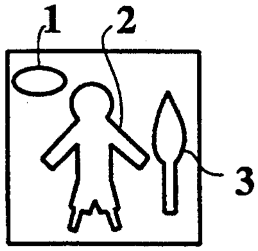
FIG. 8 is an illustration of a labelled image obtained by separating out the figure from the background.

As a result of the separation using any one of the methods described above, a labelled image shown in FIG. 8, in which the figure A1 is given a label 1, the figure A2 is given a label 2, and the figure A3 is given a label 3, is obtained.

Now, by utilizing these labels as the figure manipulation bit values, each figure can be regarded as a window of an irregular form, and various image processing operations can be performed with respect to each figure independently.

Figure 9:
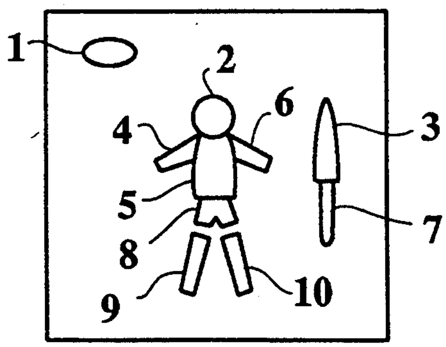
FIG. 9 is an illustration of a labelled image incorporating further subdivision.

In addition, as shown in FIG. 9, the labels can be given in a manner distinguishing different parts of the figures. For example, in FIG. 9, the figure A2 of a person is subdivided into a head 2, a right arm 4, an upper torso 5, a left arm 8, a lower torso 8, a right leg 9, and a left leg 10, while the figure A3 of a tree is subdivided into leaves 3 and a trunk 7. With this subdivision, each subdivided part can be processed independently. This subdivision can be specified either automatically by the image processing unit 13, or by the user through the mouse 9 interactively.

In a case of using such a subdivision, a table of subdivided parts shown in FIG. 10 is set up in the table look up unit 112 of the graphics controller 11. In this table of FIG. 10, a number of labelled elements are grouped together in operation level 2 and operation level 3, such that in operating at the operation level 1, each labelled element can be processed independently, while in operating at the operation level 2, an upper body of a person comprising the head 2, right arm 4, upper torso 5, and left arm 6, or a lower body of a person comprising the lower torso 8, right leg 9, and left leg 10, or a tree as a whole comprising the leaves 3 and the trunk 7, can be processed collectively as the bit block transfer unit 111 transfer these elements collectively. Also, in operating at the operation level 3, each one of the figure A1, A2, and A3 as a whole can be processed collectively, as in a case of FIG. 8.

It is pointed out that because the image processing unit 13 of this apparatus is capable of performing various image processing operations, it can be utilized in carrying out image processing on an associated work station. Conventionally, the image processing on a work station can be achieved by connecting an additional image processing device to the work station, in which case it has been necessary to transfer the image data resulting from the image processing which are stored in an image memory, to the bit map memory. In contrast, such a transfer of the image data is unnecessary in this apparatus, so that the display speed can be increased, and the image data and text data can be dealt with in a unified manner.

It is to be noted that a portion of the bit map memory 12 in the above embodiment can be utilized as a frame buffer, instead of providing a separate frame buffer 23 as in the above embodiment.

Besides this, many modifications and variations of the above embodiments may be made without departing from the novel and advantageous features of the present invention. Accordingly, all such modifications and variations are intended to be included within the scope of the appended claims.

What is claimed is:

1. A multi-window display apparatus, comprising:

a multi-window display having a display screen;

frame buffer means for storing images to be displayed on the display screen of the multi-window display;

bit map memory means for storing window images to be displayed in the multi-window display, the bit map memory means including bits indicating different regions in the window images;

image processing means for performing various image processing operations on the window images stored in the bit map memory means, by regarding the window images as graphic images, where the image processing operations separately identify data for objects represented by separate parts of the window images and convert said data for the objects to change the appearance of the objects in the window images at portions not covered by other windows of the multi-window display by processing the different regions independently; and a graphics controller including a bit block transfer means for transferring sections of the window images processed by the image processing means to the frame buffer means.

2. The apparatus of claim 1, wherein the bit map memory means has a multiple bit plane structure, in which a plurality of different types of bit values are assigned to each picture element of each window image such that each different type of bit value assigned to the window images constitutes each bit plane, and a set of bit planes are used as the bits indicating the different regions, while other bit planes are used for storing values of picture elements of the window images.

3. The apparatus of claim 1, wherein the graphics controller further includes means for controlling the transferring by the bit block transfer means, according to the bits indicating the different regions.

4. The apparatus of claim 1, wherein a plurality of the different regions can be processed collectively as a group by the image processing means.

5. A method of multi-window display, comprising the steps of:

storing window images to be displayed in the multi-window display in a bit map memory, the bit mad memory means including bits indicating different regions in the window images;

performing various image processing operations on the window images stored in the bit map memory, by regarding the window images as graphic images, where the image processing operations separately identify data for objects represented by separate parts of the window images and convert said data for the objects to change the appearances of the objects in the window images at portions not covered by other windows of the multi-window display by processing the different regions independently;

transferring appropriate sections of the window images processed at the performing step to a frame buffer by using a bit block transfer device; and displaying the image in the frame buffer on a display.

6. The method of claim 5, wherein the bit map memory has a multiple bit plane structure, in which a plurality of different types of bit values are assigned to each picture element of each window image such that each different type of bit values assigned to the window images constitute each bit plane, and a set of bit planes are used as the bits indicating the different regions, while other bit planes are used for storing values of picture elements of the window images.

7. The method of claim 5, further including the step of controlling the transferring by the bit block transfer device according to the bits indicating different regions.

8. The method of claim 5, wherein a plurality of the different regions can be processed collectively as a group at the performing step.

* * * * *